Jan. 27, 1931.  A. F. HEINEMANN ET AL  1,790,419
WINDOW GLASS HEATER
Filed May 8, 1929  3 Sheets-Sheet 1
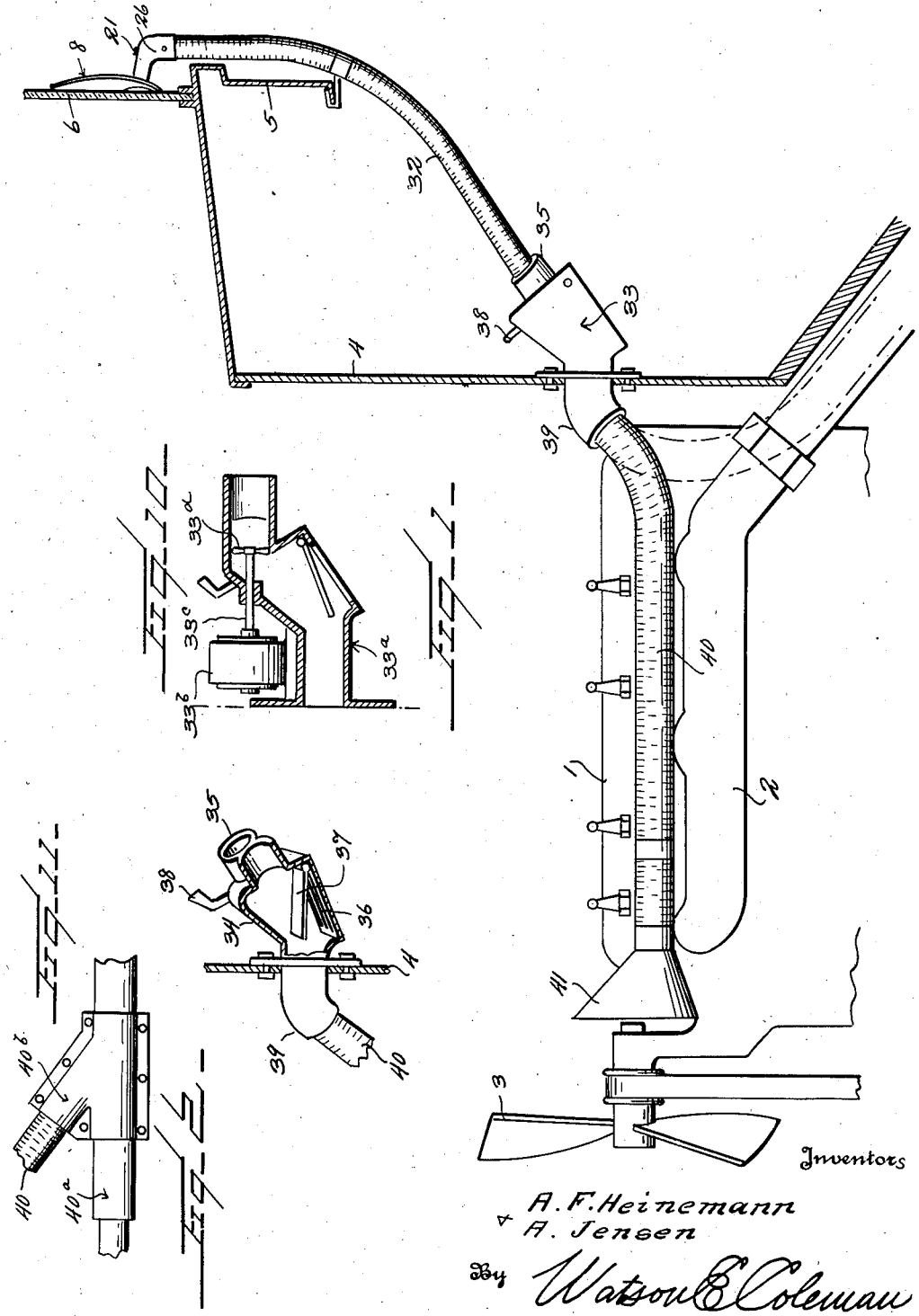
Inventors
A. F. Heinemann
& A. Jensen
By Watson E. Coleman
Attorney

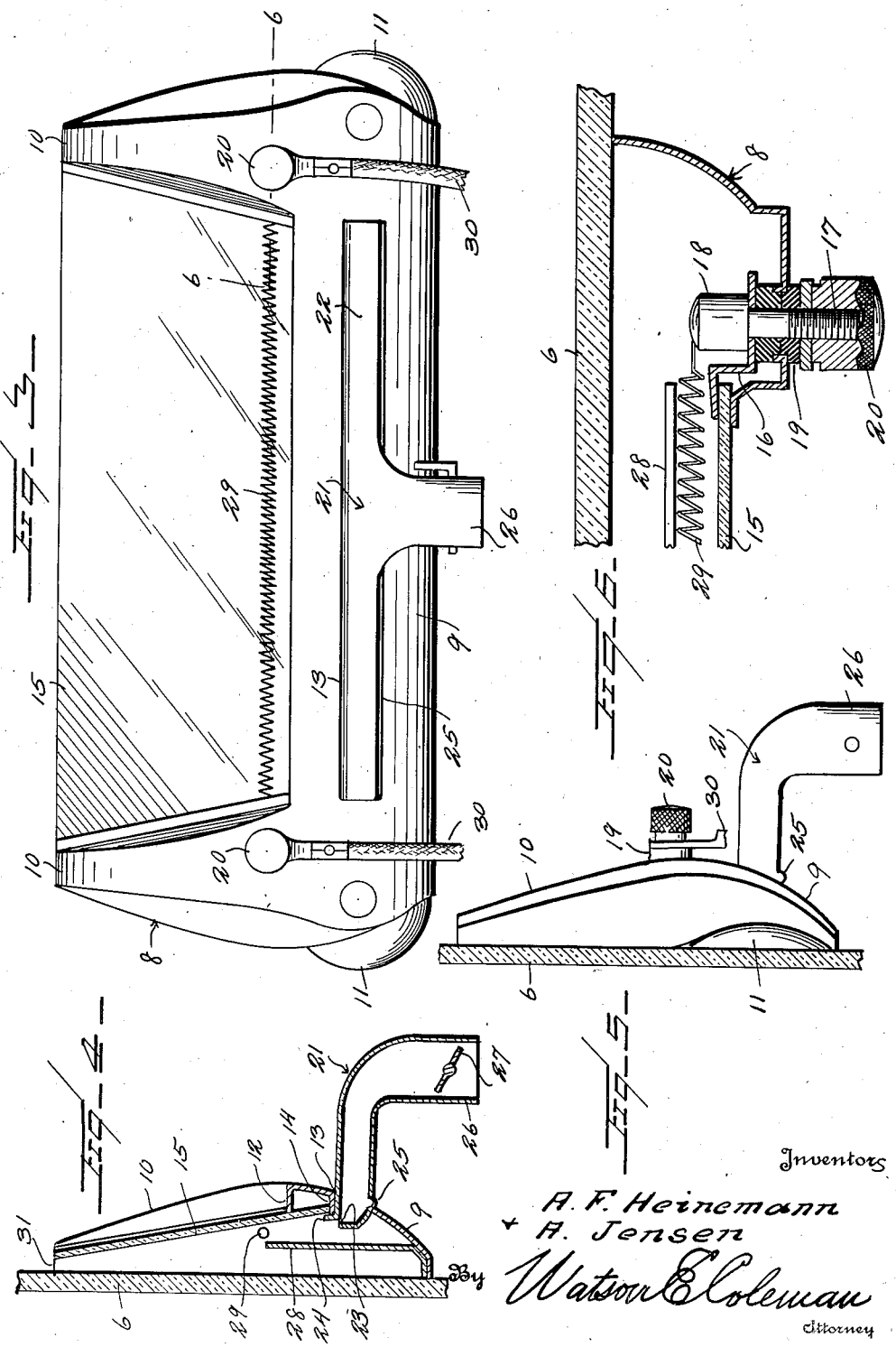

Jan. 27, 1931.  A. F. HEINEMANN ET AL  1,790,419
WINDOW GLASS HEATER
Filed May 8, 1929   3 Sheets-Sheet 3
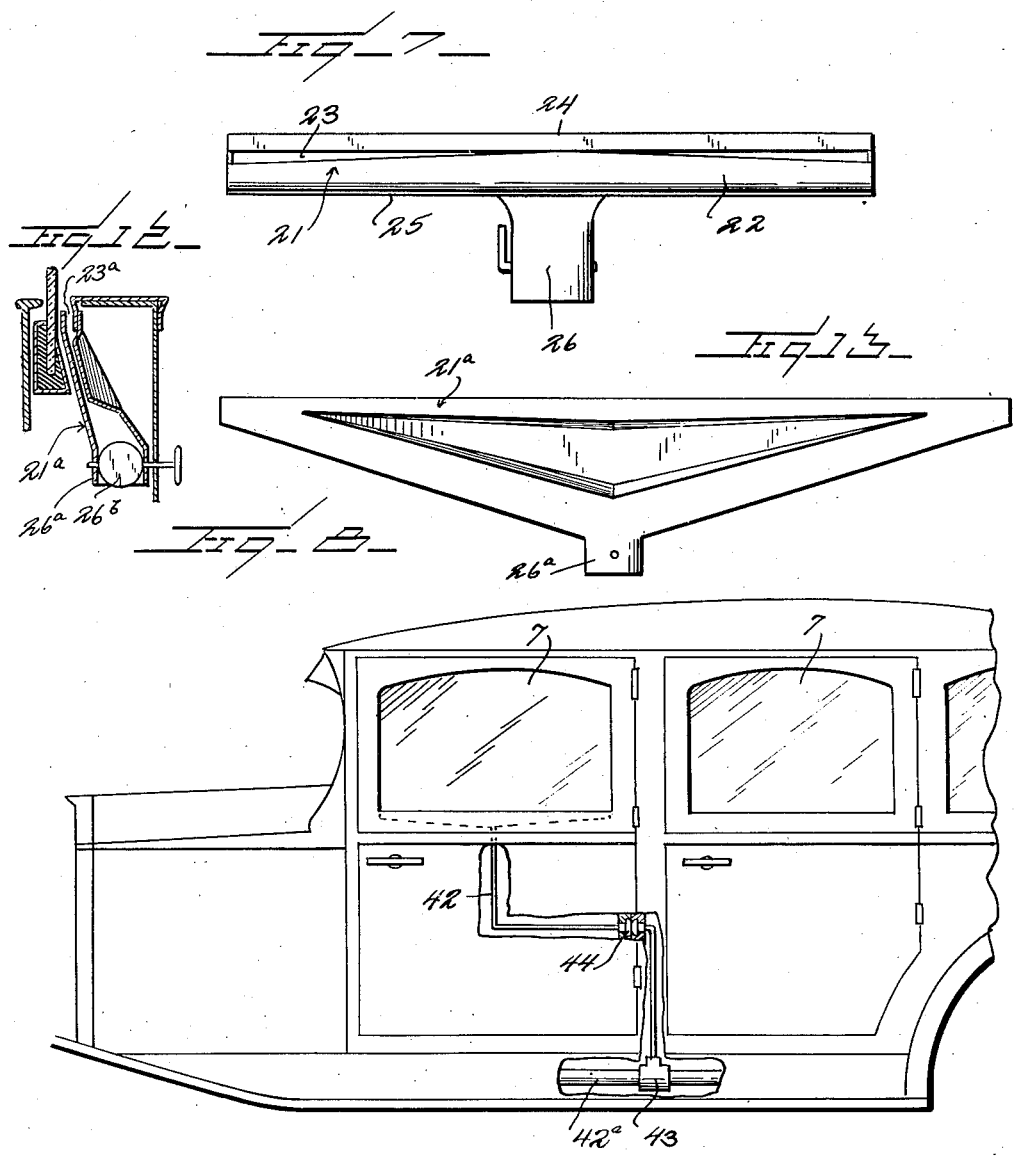
Inventors
A. F. Heinemann
& A. Jensen
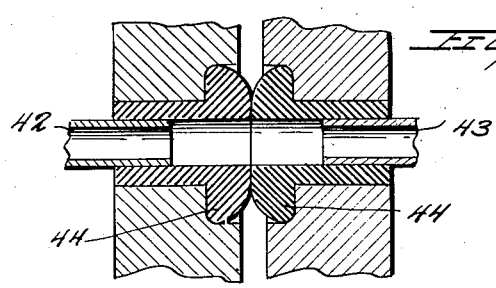
Attorney Patented Jan. 27, 1931

1,790,419

UNITED STATES PATENT OFFICE

ALFRED F. HEINEMANN AND AAGE JENSEN, OF PHILLIPS, WISCONSIN

WINDOW-GLASS HEATER

Application filed May 8, 1929. Serial No. 361,534.

This invention relates to heating devices for use upon automobile windshields and upon the windows of closed motor vehicles, the primary object of the invention being to provide a more efficient means for distributing warm air over the surface of the window or windshield glass to prevent the congelation of moisture thereon and the consequent interference with or cutting down of visibility for the motor vehicle operator and for persons in the vehicle.

The invention broadly contemplates the provision of an elongated shell open at one side and having means associated therewith whereby it may be secured against the inner face of a motor vehicle windshield or window glass, with a nozzle designed to be detachably secured to the shell to discharge heated air thereinto. The nozzle is adapted to have connected therewith a hose which is employed for conducting warm air from a suitable heating element and discharging it into the nozzle and there may be used in association with the shell an auxiliary heater of the electric type designed to further heat the air as it enters the shell for discharge against the face of the adjacent glass body. In addition to the electric heater, or in substitution therefor, the device may be adjusted to take heated air from the vicinity of the vehicle engine or may be attached to a heater for the vehicle, such for example, as those connected with the vehicle exhaust. The construction of the device is such that the electric heater in the shell may be used independently of the warm air collecting means, in which case the tube leading to the nozzle is dispensed with and a circulation of air through the shell is obtained by leaving the nozzle open to receive air from the interior of the machine in association with which the device is used.

Another object of the invention is to provide an improved means for conducting warmed air from a heating element to a distributing shell mounted upon the window of a door, which means permits the warm air conducting line to be broken when the door is opened and closed or remade upon the closing of the door.

Other objects and advantages of the present invention will become apparent as a description of the same proceeds and the invention will be best understood from a consideration of the following detailed description taken in connection with the accompanying drawings forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawings:—

Figure 1 is a view in side elevation of the structure embodying the present invention showing the same in applied position.

Figure 2 is a sectional view through the two way heated air distributing valve.

Figure 3 is a view in rear elevation of the hot air receiving shell which is applied to a window.

Figure 4 is a view taken transversely of the central portion of the shell.

Figure 5 is a view in end elevation of the shell.

Figure 6 is a sectional view taken through one end of the shell substantially upon the line 6—6 of Figure 3.

Figure 7 is a view in front elevation of the nozzle used in connection with the shell.

Figure 8 is a side elevational view of a portion of a closed motor vehicle showing the application of a modified heat conducting tube.

Figure 9 is a sectional view through a portion of the modified heat conducting pipe showing the method of coupling the two ends thereof together.

Figure 10 shows an electric air circulator forming a part of a modified two way valve structure.

Figure 11 shows an air heater mounted upon an exhaust, showing means for connecting a warm air conduit thereto.

Figure 12 is a view in cross section of the sill of a vehicle window showing the application of a warm air nozzle thereto.

Figure 13 is a view in elevation of the nozzle shown in Figure 12.

Referring to the drawings in detail wherein like numerals of reference indicate corresponding parts throughout the several views, the numeral 1 indicates a portion of a motor vehicle engine with the exhaust manifold therefor at 2 and the cooling fan forwardly thereof at 3. The lower part of the dash of the vehicle is indicated at 4 with the instrument board at 5 and the windshield 6 thereabove in the usual manner.

The present heater device for the windshield 6 and it is also designed to be used to prevent the formation of frost upon the windows of the car which are here indicated by the numerals 7, comprises a shell or casing indicated as a whole by the numeral 8. This shell preferably consists of a broad frame which has a bottom portion 9 of arcuate cross sectional design and upstanding end portions 10 each of which is also of arcuate or curved cross sectional design so that when the open side of the shell is placed against one side of a window glass, the outer edge of each side member 10 and the lower end of the portion 9 will bear against the same. At each end of the member 9 a suitable space is provided for securing against the inner face of the member vacuum cups 11 which may be placed against the face of the window glass to secure the shell in position thereagainst.

The top edge of the lower portion 9 of the shell is turned inwardly slightly as indicated at 12 and directly beneath this turned in edge this portion is provided with a longitudinally extending slot 13, the upper edge of which is also turned in to form the flange 14. Covering the space between the side portions 10 of the shell frame is a glass panel 15, the lower edge of which extends beyond the inturned edge 12 and rests upon the flange 14 at the upper edge of the slot 13 and the sides of this panel are held in close contact with the inner sides of portions 10 of the frame by clips 16, each of which extends longitudinally of the inner face of the portion 10 and overlies the edge of the glass panel in the manner shown in Figure 6. These clips have passed therethrough at suitable points, holding screws 17 each of which has an enlarged head 18 which bears against the inner face of the clip strip and each screw passes through suitable washers 19 and through the adjacent portion 10 of the frame to receive upon its outer end a thumb nut 20 by means of which it and the clip through which it passes is drawn to position.

The outlet 23 of the nozzle 21 is restricted intermediate the ends of the nozzle as shown and is of gradually increasing width from the central portion toward the ends so that the heated air passing through the outlet will be spread as it is discharged to more effectively heat the surface of the glass pane against which the heating shell is secured.

With the structure thus far described the windshield or one of the window panes of a car may be sufficiently warmed to prevent the congealing of moisture thereon, a circulation of air being maintained through the nozzle 21 past the heating coil 29 and along the inner face of the glass as will be readily understood. With this structure the air for discharging through the nozzle is taken directly from the interior of the car.

In order to supplement the action of the heating element 29 or if desired in order to heat the glass without employing the resistance element 29 a suitable flexible hose 32 may be attached at one end to the inlet end of the nozzle and for connection to the other end of this hose there is provided an especially constructed distributing valve which is indicated as a whole by the numeral 33.

The valve 33 comprises a casing 34 having two outlets 35 to permit of the connection thereto of a pair of tubes 32 so that two heating shells may be employed for the vehicle windshield, one at each side thereof. The lower wall of this casing is formed to provide a register 36 and within the casing is pivotally mounted a valve plate 37 which is adapted to close either the register 36 or the outlets 35 as desired. For the actuation of this valve plate a suitable lever 38 is provided which is positioned at one side of the casing so that the valve may be controlled by the foot of the vehicle operator.

Designed for engagement in the slot 13 of the shell is a nozzle 21 which, as shown, has a long flat head 22 which opens upwardly as at 23 at the forward edge, a flange 24 being formed along the inner edge of the opening 23 and beneath the flange the underside is provided with a longitudinally extending rib 25. This head 22 is inserted into the slot 13 in such manner as to bring the flange 24 to position against the inner edge of the frame flange 14 and the rib against the lower edge of the slot 13 as shown in Figure 4.

The weight of the tubular inset portion 26 of the nozzle which extends downwardly as shown, acts to maintain the nozzle in position. This tubular portion 26 is provided with a valve 27 which while it may be of any appropriate design is preferably of the butterfly type.

Within the shell 8 there is secured longitudinally and to the inner face of the portion 9 of the frame an upstanding baffle plate 28 which projects a substantial distance above the inlet 23 of the nozzle. Swung between the heads 18 of a pair of clip securing screws to extend transversely of the shell between the glass panel 15 thereof and the baffle plate 28 is an electric resistance heating coil 29 each end being soldered to its supporting screw head, as shown. Suitable wires or cables 30 are connected to the screws at the ends of the heating coil 29 to conduct current thereto for heating the coil as desired and as will be hereinafter further described.

It is, of course, understood that the panel 15 of the shell, or in the event that a complete pressed metal shell is employed, the upper edge thereof, is spaced sufficiently from the inner edges of the side member 10 to provide a heat outlet opening 31 along the upper edge of the shell.

An inlet coupling 39 extends from the wall of the casing 34 and is designed to pass through the dash board 4 of the vehicle in the manner shown. The inlet end of this coupling is turned downwardly to receive a suitable warm air hose 40 which may be passed along the top of the engine exhaust manifold 2 to the forward end thereof at which point t may be provided with the enlarged funnel shaped body 41 positioned to receive air driven rearwardly by the engine fan 3.

In addition to obtaining air in heated condition through the hose 40 by placing the same upon or over the exhaust manifold, in the manner shown in Figure 1, and arranging the open end thereof to receive air driven back by the engine fan 3, this hose may be turned back as indicated by the dotted lines in Figure 1 for connection to a heating device of the vehicle. For example, as shown in Figure 11, an exhaust pipe air heater 40ª may be provided with a suitable nipple 40ᵇ to which the end of the hose 40 may be attached so that hot air may be obtained from this source and conveyed through the valve 33 to the nozzle in the manner described in the foregoing paragraph.

While I have shown a conventional heater 40ª it is, of course, to be understood that this indicates only one of a number of different types of heaters to which the hose 40 may be connected as for example, any one of the numerous types of hot air heaters or hot water heaters may be employed for warming air passing to the nozzle 8 for the accomplishment of the purpose described. Due to the manner in which the receiving end 39 of the valve 33 is directed downwardly, the flexible air hose 40 may be conveniently bent to extend in any direction for attachment to any type of air heater with which the vehicle may be equipped.

In order to boost the flow of warm air through the tubes 32 and 40, I provide a distributing valve 33ª similar to the valve 33, equipped with an electric motor 33ᵇ having the shaft 33ᶜ extended through the wall of the valve and carrying upon its inner end a fan 33ᵈ. This fan is located, as shown, adjacent the outer nozzle of the valve casing to which the hose 32 may be attached and operates to accelerate the movement of air passing therethrough toward the distributing nozzle 8. This structure may be used in substitution for the structure 33 when the hose 40 is not used in the manner shown in Figure 1, so that the warm air passing therethrough will circulate at the necessary speed. Of course, if found desirable the fan 33ᵈ may be used in association with the structure as shown in Figure 1.

With this structure it will be readily understood that additional warm air may be passed from the vicinity of the engine to the distributing valve 33 from which it may be discharged into the passage 32 or through the register 36 into the vehicle as desired, or both.

A modified form of the nozzle 21 may be employed for discharging heated air against the windows 7 of the vehicle which nozzle is shown in Figures 12 and 13 and is indicated generally by the numeral 21ª. As shown in these figures, this nozzle 21ª corresponds to the opening 23 of the nozzle 21 and an inlet tube 26ª corresponds to the tube 26 of the nozzle 21. This tube is also provided with a control valve 26ᵇ which, when the nozzle is in position in a door or window frame, in the manner shown in Figure 12, has the control stem therefor extending through the inner wall of the frame. As is also shown in Figure 12, the nozzle is so positioned that the outlet opening 23ª discharges against the window glass through the space between the slot into which the glass drops.

When the nozzles 21ª are in position in the car window frames in the manner described they may each have connected thereto one end of a warm air conducting tube 42 which tube may be suitably attached to a suitable warm air supply line 42ª having suitable couplings 43 for the connection of the tubes thereto as shown. Where the tube 42 must be passed from the fixed portion of the vehicle body into the body of the door, means is provided which will permit the breaking of the tube in order to allow the door to be opened. This means comprises a pair of tubular rubber bumpers 44, one of which is secured upon the end of the broken tube 43 where it opens through the jam of the door while the other is secured to the adjacent end of that portion of the tube which is carried by the door body. These bumpers are exposed upon the faces of the door edge and the door jamb so that when the door is closed they will be brought into alignment as shown in Figure 9 and will provide a leak proof connection between the portions of the heat conducting tube.

From the foregoing description it will be readily seen that with a heating device of the character embodying the present invention, the windows and the windshield of a closed motor vehicle may be kept free of ice or frost during cold weather and will thereby eliminate a most annoying and dangerous feature of cold weather or winter driving.

While I have specifically described the application of the warm air conducting tube 40 to the motor vehicle exhaust manifold it is, of course, to be understood that I do not wish to be limited in connection with the disposition of this tube of the manner of employing it for the collection of warm air for it will be readily understood that it may be extended to position beneath the car for attachment to one of the many types of heating elements associated with the exhaust pipe.

Having thus described my invention, what I claim is:—

1. In a window glass heater, a relatively flat shell open at one side, means for securing the open side of said shell against a window glass with three of the four edges thereof in close contact with the glass, said shell having an inlet opening in the lower portion thereof, an air inlet nozzle removably positioned in said opening, and means for heating air passing through the nozzle and into the shell, said heating means being arranged within the shell above the inlet opening therefor and said nozzle discharging upwardly into the shell beneath said heating means.

2. A vehicle window heater comprising a warm air distributing element consisting of a shell having an open side and adapted to be secured with the open side against a window glass, an air collecting and warming tube, means for connecting one end of the tube with the shell for discharge into the lower portion thereof, and a warm air distributing valve interposed in said air collecting and warming tube and designed to shunt air from the shell into the vehicle.

3. A vehicle window heating device comprising an elongated relatively flat shell having one side open and further having a slot formed longitudinally therethrough adjacent the lower edge, means for securing the shell to a window glass with the open side thereagainst and with the upper edge spaced from the glass to provide an outlet opening, an air inlet nozzle removably hung in said slot and formed at its inner end to discharge upwardly into the shell, a baffle wall in the shell before the discharge opening of the nozzle, and a heating element in the shell between the outer wall thereof and the baffle wall and located above the discharge opening of the nozzle.

4. A vehicle window heating device comprising an elongated relatively flat shell having one side open and further having a slot formed longitudinally therethrough adjacent the lower edge, means for securing the shell to a window glass with the open side thereagainst and with the upper edge spaced from the glass to provide an outlet opening, an air inlet nozzle removably hung in said slot and formed at its inner end to discharge upwardly into the shell, a baffle wall in the shell before the discharge opening of the nozzle, and a heating element in the shell between the outer wall thereof and the baffle wall and located above the discharge opening of the nozzle, said nozzle having the outlet opening thereof formed to spread air passing therethrough.

5. A vehicle window heating device comprising an elongated relatively flat shell having one side open and further having a slot formed longitudinally therethrough adjacent the lower edge, means for securing the shell to a window glass with the open side thereagainst and with the upper edge spaced from the glass to provide an outlet opening, an air inlet nozzle removably hung in said slot and formed at its inner end to discharge upwardly into the shell, a baffle wall in the shell before the discharge opening of the nozzle, and a heating element in the shell between the outer wall thereof and the baffle wall and located above the discharge opening of the nozzle, said nozzle having a downwardly opening receiving end and a control valve therein.

6. A vehicle window heating device comprising an elongated relatively flat shell having one side open and further having a slot formed longitudinally therethrough adjacent the lower edge, means for securing the shell to a window glass with the open side thereagainst and with the upper edge spaced from the glass to provide an outlet opening, an air inlet nozzle removably hung in said slot and formed at its inner end to discharge upwardly into the shell, a baffle wall in the shell before the discharge opening of the nozzle, and an electric heating coil extending longitudinally in the shell between the upper portion of the baffle wall and the shell wall and above the upwardly discharging nozzle outlet.

7. A window glass heating device of the character described comprising a relatively flat shell body having one side open and comprising a frame consisting of a lower portion provided with a longitudinally extending slot and upstanding end portions carried by the lower portion, said portions being formed to stand away from a supporting surface when the outer edges thereof are pressed thereagainst, a glass panel carried by the frame to position the upper edge thereof away from a supporting surface, a warm air inlet nozzle comprising a head and an inlet end, means for detachably engaging said head in said slot, the head having a discharge opening directed upwardly, and means for heating and conducting air to said nozzle for discharge into the shell.

8. A window glass heating device of the character described comprising a relatively flat shell body having one side open and comprising a frame consisting of a lower portion provided with a longitudinally extending slot and upstanding end portions carried by the lower portion, said portions being formed to stand away from a supporting surface when the outer edges thereof are pressed thereagainst, a glass panel carried by the frame to position the upper edge thereof away from a supporting surface, a warm air inlet nozzle comprising a head and an inlet end, means for detachably engaging said head in said slot, the head having a discharge opening directed upwardly, and a heating element within the shell above the outlet of said nozzle.

9. A window glass heating device of the character described comprising a relatively flat shell body having one side open and comprising a frame consisting of a lower portion provided with a longitudinally extending slot and upstanding end portions carried by the lower portion, said portions being formed to stand away from a supporting surface when the outer edges thereof are pressed thereagainst, a glass panel carried by the frame to position the upper edge thereof away from a supporting surface, a warm air inlet nozzle comprising a head and an inlet end, means for detachably engaging said head in said slot, the head having a discharge opening directed upwardly, and a heating element within the shell above the outlet of said nozzle, said nozzle outlet opening being formed to spread laterally air passing therethrough into the shell.

10. In a device of the character described including a warm air conducting pipe, a distributing valve for controlling air passing therethrough comprising a casing having an inlet and a pair of outlet openings, one of said outlet openings being designed for connection in a pipe line, the other outlet opening constituting a warm air discharging register, and an oscillatable valve element within the casing designed for selective control of the passage of air through said outlet openings.

11. A heated air conductor for supplying a door carried warm air distributor from a fixed structure, comprising a pair of tubular bodies, one carried by the door and having connection at one end to the distributor and opening at the other end through an edge of the door, the other carried by the fixed structure and opening at one end through a side of the frame for the door for alignment with said other end of the first body, and resilient bodies carried by the abutting ends of the tubular bodies designed to abut one another to form a leak proof joint.

12. In a vehicle window glass heater, a warm air receiving and distributing element adapted to be mounted for discharge against a window glass, an air collecting and warming body having connection with said element for discharge thereinto, a warm air distributing valve in said body designed for shunting air from the element into the vehicle, and a heating element in said air receiving element for supplementing the action of the air collecting body.

13. A nozzle for the purpose set forth, comprising a hollow head formed to provide a relatively long discharge edge having a slot therein, one edge of the slot intermediate its ends closely approaching the other edge thereof and gradually receding therefrom toward each end of the head, and an air inlet for the head remote from said slot.

14. A nozzle for the purpose set forth, comprising a hollow head formed to provide a relatively long discharge edge having a slot therein, one edge of the slot intermediate its ends closely approaching the other edge thereof and gradually receding therefrom toward each end of the head, an air inlet for the head remote from said slot, and an air deflecting flange extending along the said other edge and projecting upwardly therefrom in a plane substantially parallel to the plane in which a current of air would be discharged from the slot.

15. In a window glass heating device of the character described, a relatively flat shell body having one side open and comprising a frame consisting of a lower portion provided with a longitudinally extending slot and upstanding portions carried by the lower portion, said end portions being formed to stand away from a supporting surface when the outer edges thereof are pressed against the surface, a glass panel arranged against the edges of said upstanding portions to close the area between the same, a threaded stud extending through each of said upstanding portions having a head upon its inner end, a clip member removably held by each of said studs and engaging over an adjacent edge of the glass panel to maintain the same in position, an electrical resistance heating element arranged between and connected to the heads of the studs carried by said upstanding portions, said studs at their outer ends providing electric wire terminals, and means carried by the shell body adjacent each side thereof for maintaining the same in close contact with a window glass.

16. In a window glass heating device of the character described, a relatively flat shell body having one side open and comprising a frame consisting of a lower portion provided with a longitudinally extending slot and upstanding portions carried by the lower portion, said end portions being formed to stand away from a supporting surface when the outer edges thereof are pressed against the surface, a glass panel arranged against the edges of said upstanding portions to close the area between the same, a threaded stud extending through each of said upstanding portions having a head upon its inner end, a clip member removably held by each of said studs and engaging over an adjacent edge of the glass panel to maintain the same in position, an electrical resistance heating element arranged between and connected to the heads of the studs carried by said upstanding portions, said studs at their outer ends providing electric wire terminals, means carried by the shell body adjacent each side thereof for maintaining the same in close contact with a window glass, and a baffle plate arranged vertically in the lower portion of the body and extending across said slot for directing air entering the slot upwardly against said heating element.

17. A heated air discharge nozzle of the character and for the purpose described, comprising a head having a relatively long air discharge opening, means cooperating with the discharge opening for spreading the air issuing therefrom to cause the same to issue at a substantially even rate of flow throughout the length of the slot, and means for introducing the air to the head at a point opposite and intermediate the ends of the slot.

18. In a windshield heater, an elongated shell adapted to have three of the four sides thereof arranged in contact with the windshield, the fourth edge being spaced from the windshield and opening upwardly, an air intake adjacent the bottom of the shield, an air guide or baffle within the shell, and means for heating the air which is passed through the shell from said air intake to and through the open edge thereof.

19. In a windshield heater, an elongated shell adapted to have three of the four sides thereof arranged in contact with the windshield, the fourth edge being spaced from the windshield and opening upwardly, an air intake adjacent the bottom of the shield, an air guide or baffle within the shell, and means within the shell located between the air intake and the open upper edge thereof for heating air entering the shell through said intake.

In testimony whereof we hereunto affix our signatures.

ALFRED F. HEINEMANN.
AAGE JENSEN.